United States Patent [19]
Kilts

[11] Patent Number: 5,110,015
[45] Date of Patent: May 5, 1992

[54] SEALING ARRANGEMENT FOR DRY GOOD FEEDER

[75] Inventor: Harold J. Kilts, Minneapolis, Minn.

[73] Assignee: Tecnetics Industries, Inc., St. Paul, Minn.

[21] Appl. No.: 449,548

[22] Filed: Dec. 12, 1989

[51] Int. Cl.[5] ............................................. G01F 11/20
[52] U.S. Cl. .................................. 222/413; 277/152; 285/396
[58] Field of Search ............... 222/412, 413, 148; 198/672, 674, 659, 676, 666; 277/133, 134, 152; 403/348, 349; 209/910, 913; 285/360, 361, 376, 396, 401, 401, 402

[56] References Cited

U.S. PATENT DOCUMENTS

| | | | |
|---|---|---|---|
| 1,914,485 | 6/1933 | Burton | 198/674 |
| 2,032,196 | 2/1936 | Blake | 285/396 |
| 2,723,876 | 11/1955 | Langlois | 403/349 |
| 3,074,822 | 1/1963 | Walk et al. | 222/413 |
| 3,481,512 | 12/1969 | Scheffer et al. | 222/413 |
| 3,602,552 | 8/1971 | Morgan | 198/672 |
| 4,566,583 | 1/1986 | Schneider | 198/659 |
| 4,715,515 | 12/1987 | Steilen | 222/143 |

Primary Examiner—Michael S. Huppert
Assistant Examiner—Philippe Derakshani
Attorney, Agent, or Firm—Merchant, Gould, Smith, Edell, Welter & Schmidt

[57] ABSTRACT

An improved drive seal arrangement for a dry good material feeder includes an auger member which is provided with a helical flight that extends into the space proximate the drive shaft seal so as to create an underpressure proximate the seal and keep the dry material which is to be conveyed away from the seal. A novel shaft connecting linkage is further provided to isolate the seal from vibration or shock which is imparted to the drive auger during operation. A novel modular construction is also provided whereby the hopper and auger member may be dismounted from a power unit, which slides into the hopper as a single module so as not to affect the drive shaft seal.

16 Claims, 3 Drawing Sheets

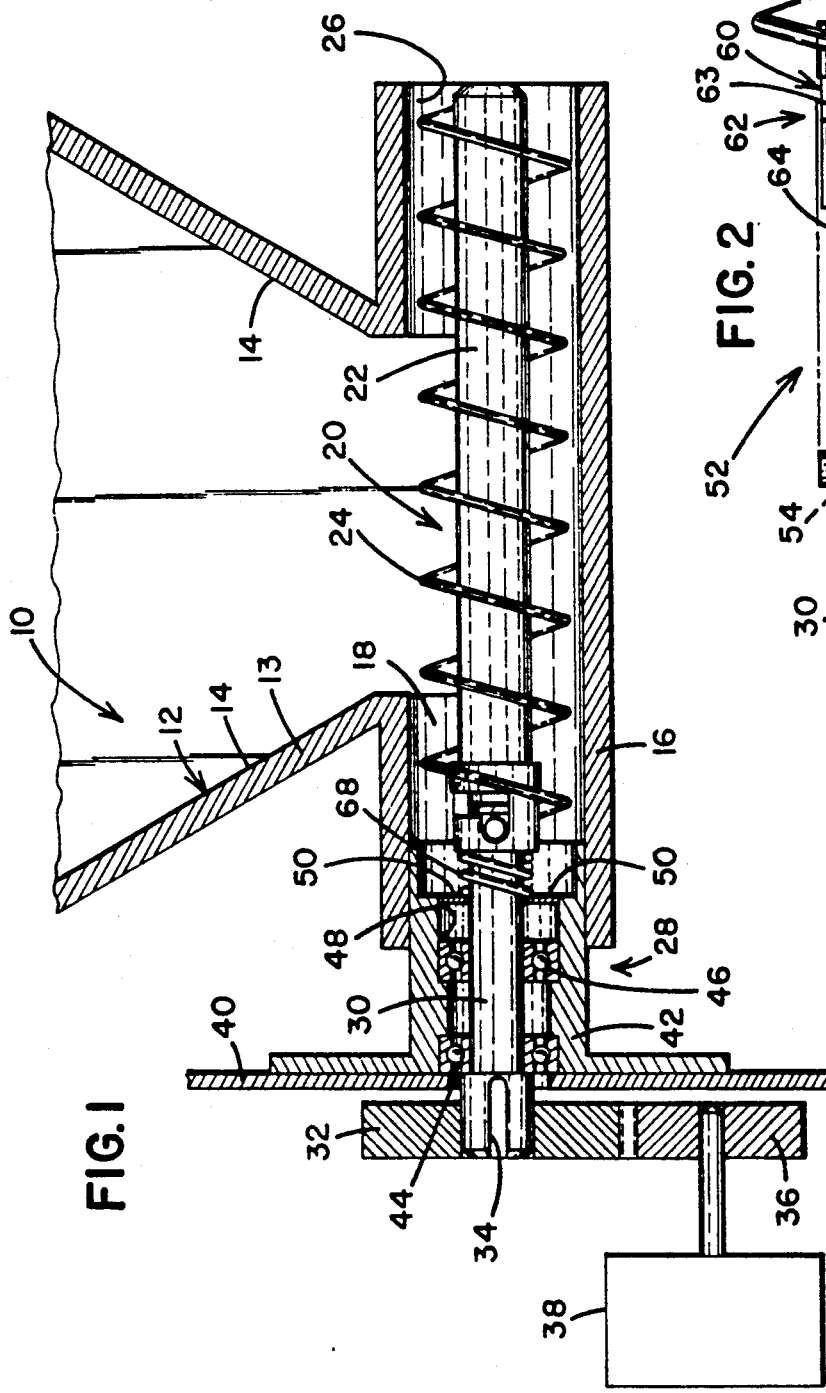
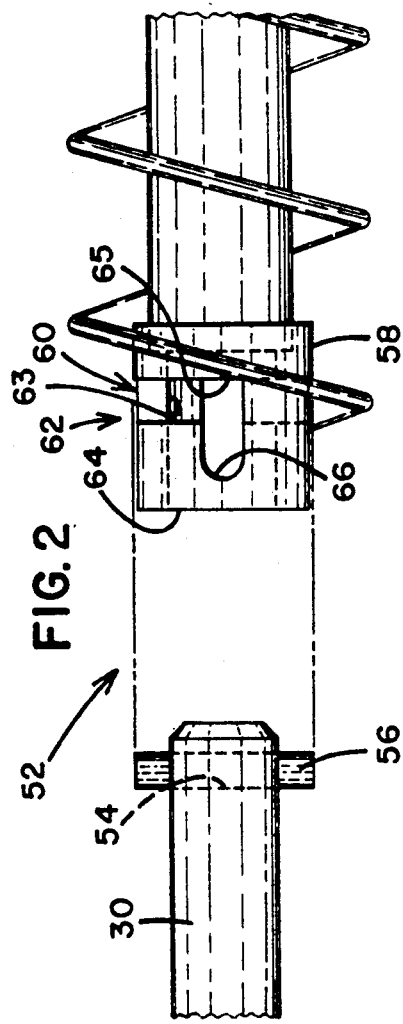

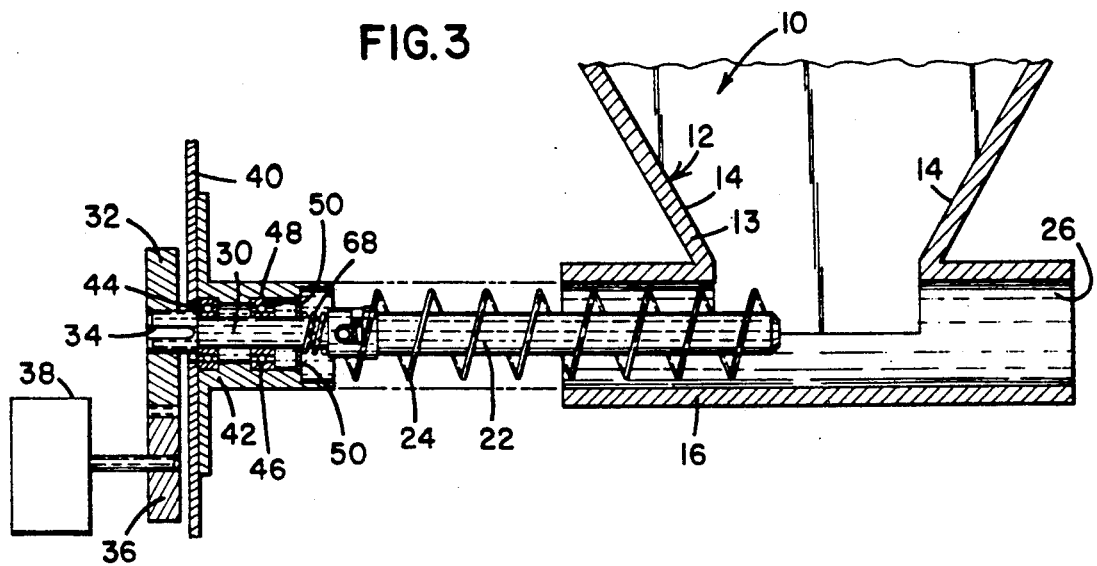

SEALING ARRANGEMENT FOR DRY GOOD FEEDER

BACKGROUND OF THE INVENTION

1. Field of the Invention

This invention relates to dry good material feeding devices which are used for dispensing or conveying powders and bulk dry materials such as chemicals. More particularly, this invention relates to an improved seal for where a drive shaft enters into the hopper of such a device, which provides longer lasting and more effective protection against leakage of the dry material than those seals which were heretofore known.

2. Description of the Prior Art

Dry good material feeders of the type which are manufactured at Tecnetics, Inc. of St. Paul, Minn. which is the assignee of this application, commonly include a hopper having an inclined storage area and a lower cylindrical portion for housing a rotating auger. The rotating auger conveys dry material such as a powdered chemical from the inclined holding area through a cylindrical passage to a space outside of the hopper. In order to provide the mechanical energy which is necessary to turn the auger, most prior art arrangements utilize a drive arrangement which extends from the opposite end of the auger from the direction in which the dry material is conveyed.

To ensure that the dry material does not escape into the drive mechanism for the rotating auger, it is necessary to place some type of a seal between the drive shaft and the housing. However, due to a number of factors, such seals were often susceptible to premature failure. Because the drive shaft seal was at the bottom of the hopper, the dry material which was to be conveyed was often forced up against the seal at a relatively high pressure, which hastened degradation of the seal. In addition, the constant vibration imparted to the seal by the auger via the drive shaft often loosened the seal, which allowed the dry matter to enter into the drive mechanism for the auger. Yet another reason for seal failure was the wear which took place on the seal when the seal needed to be withdrawn from the hopper, such as for maintenance.

It is clear that there has existed a long and unfilled need in the art for an improved sealing arrangement for dry good feeders which provides reduced dry good pressure in the area immediately next to the seal, which provides increased isolation of the seal from shocks which are imparted to the auger during operation, and which can endure more cycles of seal removal.

SUMMARY OF THE INVENTION

Accordingly, it is an object of the invention to provide an improved sealing arrangement for dry good feeders which decreases the pressure of the dry material in the space which is immediately proximate the drive shaft seal.

It is further an object of the invention to provide an improved sealing arrangement which provides increased vibrational isolation of the seal from the auger which is used to convey the dry material.

It is yet a further object of the invention to provide a seal for dry good material feeders which is more resistant to failure as a result of cyclical maintenance.

In order to achieve these and other objects of the invention, a dry good material feeding apparatus having an improved seal arrangement according to the invention includes a feed hopper having an outer wall defining a storage portion for holding dry material in an auger housing portion, the auger housing portion having a first cylindrical space defined therein on a first side, and a second cylindrical space defined therein on a second side, the first and second cylindrical spaces being substantially aligned and extending through the outer wall so as to communicate the storage position with an exterior space; an auger member having a shaft and at least one helical flight connected thereto, the auger member being positioned so as to extend into both of the first and second cylindrical spaces; structure positioned in the first cylindrical space for supplying mechanical energy to turn the auger member; and structure for sealing the supplying means with respect to the feed hopper, whereby dry material is prevented from escaping the hopper via the first cylindrical space, the helical flight extending in the first cylindrical space to an area which is proximate the sealing means, whereby dry material is urged away from the sealing means during operation of the apparatus.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIG. 1 is a fragmentary view of a sealing arrangement according to a first embodiment of the invention, depicted partially in cross-section;

FIG. 2 is a fragmentary isolational view depicting the details of a shaft connecting linkage according to the embodiment of FIG. 1;

FIG. 3 is a diagrammatical view of depicting removal of the power unit pictured in the embodiment of FIG. 1 from the remainder of the apparatus;

DETAILED DESCRIPTION OF THE PREFERRED EMBODIMENT(S)

Figure 4:
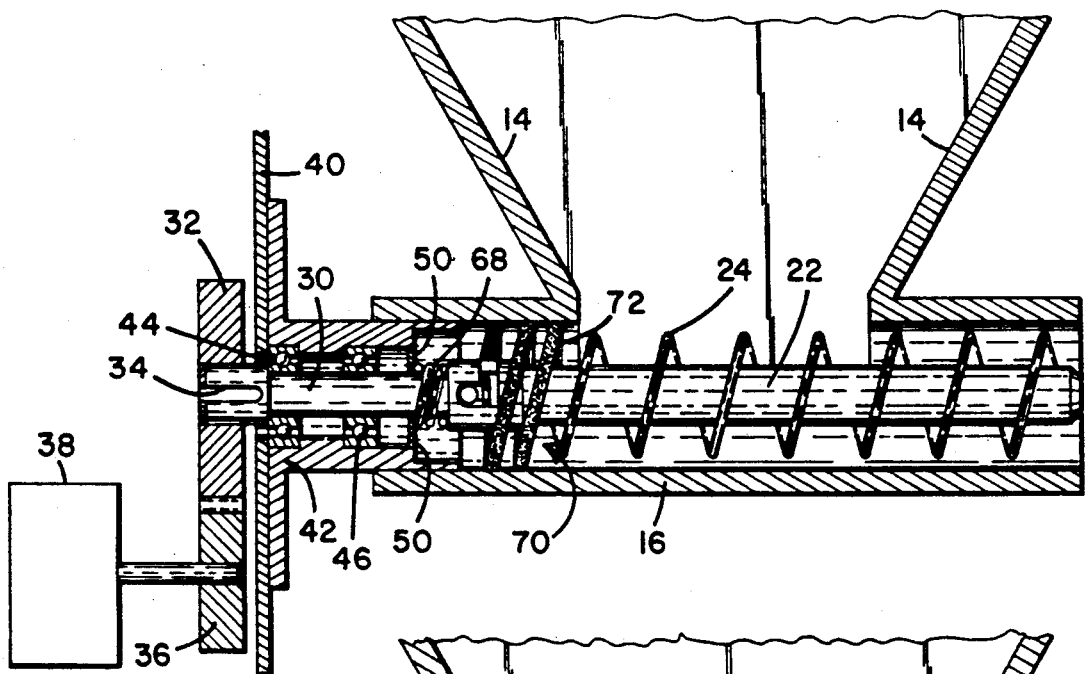
FIG. 4 is a fragmentary cross-sectional view depicting a sealing arrangement according to a second embodiment of the invention.

Referring now to the drawings, wherein like reference numerals designate corresponding structure throughout the views, and referring in particular to FIG. 1, an improved sealing arrangement 10 according to a first embodiment of the invention includes a flexible hopper 12 which has an outer wall 13. Wall 13 defines a storage portion for holding dry material. Wall 13 includes a ramp portion 14 for guiding the dry material downwardly toward a feed auger 20. Hopper 12 further includes a portion 16 which has a cylindrical space 18 defined therein for housing the feed auger 20, as may be seen in FIG. 1.

Auger member 20 is partially disposed within cylindrical space 18, and extends through a cylindrical discharge space 26 which is defined on an opposite side of hopper 12 from the cylindrical space 18. Discharge space 26 is of approximately the same diameter as and is substantially aligned with cylindrical space 18. Auger member 20 includes a stub shaft 22 and a helical flight 24. Flight 24 preferably extends along the entire length of the auger member 20.

According to one novel aspect of the invention, a modular power unit 28 is provided which can conveniently be separated from the flexible hopper 12 during maintenance, as will be described in greater detail below. The power unit 28 includes a drive shaft 30 which is rotatably fixed with respect to a drive shaft sprocket 32 by a keyway arrangement 34. A drive sprocket 36 is meshed with drive shaft sprocket 32 and is connected to be driven by a drive motor 38. The drive shaft sprocket 32, a drive sprocket 36 and a motor 38 are preferably mounted within a housing which includes an end plate 40 for which the drive shaft 30 extends. Power unit 28 further includes a rigid tubular member 42 which is integral with end plate 40 and extends into cylindrical space 18, so that its cylindrical outer surface seals tightly against the inner surface of hopper 12 which defines cylindrical space 18. The rigid tubular member 42 has a cylindrical bore defined therein by an inner surface 48. A pair of roller bearings 44, 46 are disposed between the inner surface 48 and the drive shaft 30 so as to support the drive shaft 30 for rotation coaxial with the tubular member 42.

Referring again to FIG. 1, a lip seal 50 is interposed within the cylindrical space 18. Seal 50 includes a lipped outer portion having a circumferential surface which bears against the inner surface 48 of the rigid tubular member 42. A second inner annular section of the lip seal 50 seals against the outer surface of drive shaft 30, as is shown in FIG. 1.

According to one important aspect of the invention, the flight 24 on auger member 20 extends into cylindrical space 18 to a space which is immediately proximate the lip seal 50. As a result, the pressure of the dry material in the space proximate lip seal 50 is reduced during operation of the dry good feeder, which lessens wear on the lip seal 50. This provides a substantial advantage, because it negates the increased pressure on lip seal 50 which would otherwise be created by the weight of dry material that is stored in the storage portion of flexible hopper 12.

In order to isolate lip seal 50 from shock or vibration from the auger member 20 during operation, a novel shaft connecting linkage 52 is also provided. Shaft connecting linkage 52 includes a radial bore which is defined in one end of the shaft 30 for receiving a pin 56, as is best shown in FIG. 2. A collar member 58 is connected to and has an enlarged cross-section relative to the stub shaft 22 of auger member 20. A pair of guide slots 60 are defined in the circumferential wall of collar member 58 for receiving the pin 56. Each of the guide slots 60 includes an opening 62 through which pin 56 may be inserted, and further includes an axially extending portion 63 and a circumferentially extending portion 65. A locking recess 66 is provided adjacent the horizontally extending section 65 of guide slot 60, as may be seen in FIG. 2. It will be noted that the configuration of the guide slot 60 which is not shown in FIG. 2 will be identical to the one shown in FIG. 2, except that the circumferentially extending portion 65 will extend in the opposite circumferential direction.

Referring briefly to FIG. 1, a helical compression spring 68 is provided between the lip seal 50 and an end surface 64 of the collar member 58. Spring 68 acts to keep the pin 56 seated within the locking recesses 66 of the corresponding guide slots 60 during operation of the dry good feeder.

Looking now to FIG. 4, a second embodiment of a seal arrangement constructed according to the invention includes an auxiliary cleaning attachment 70 for further protection against material being pressed against the seal. In the most preferred embodiment, attachment 70 is a helical brush 72. Helical brush 72 fits tightly within cylindrical space 18, and is oriented in the same direction as the helical flight 24, so as to direct material away from lip seal 50. In the illustrated embodiment flight 24 stops at the point brush 72 begins, but it is to be understood that brush 72 could extend along the same length of shaft 22 together with flight 24.

Figure 5:
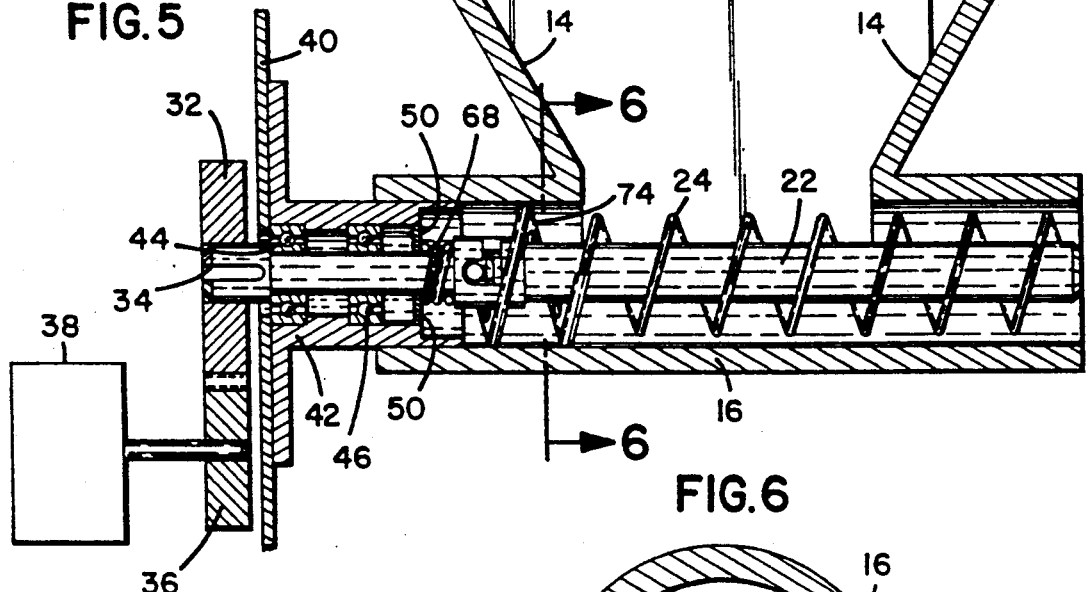
FIG. 5 is a fragmentary cross-sectional view depicting a third embodiment of the invention.
Figure 6:
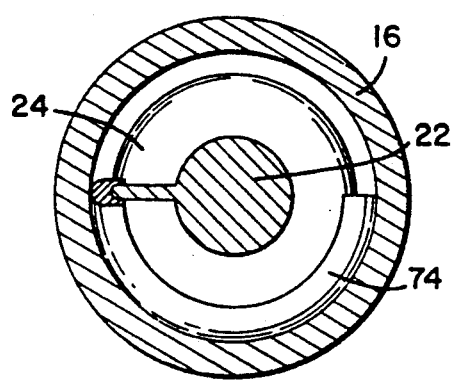
FIG. 6 is a cross-sectional view depicting a seal arrangement according to the third embodiment shown in FIG. 5.

FIGS. 5 and 6 depict an alternative embodiment of a second facet of the invention. In the embodiment depicted in FIGS. 5 and 6, a sealing lip 74 is provided on the outer helical edge of auger flight 24. The outer edge of lip 74 seals against the inner surface of portion 16 which defines cylindrical space 18. Lip 74 is preferably made of a softer, more resilient material than auger flight 24, such as leather or a suitable polymer.

Typically, it is periodically necessary to disconnect the power unit 28 from auger member 20 in order to service the dry good feeder. One distinct advantage of this invention is that it allows withdrawal of the seal mechanism and auger drive mechanism as a modular unit, with a minimum of inconvenience.

In order to change or to clean the hopper 12, auger member 20 is grasped and pushed axially toward the drive shaft 30, which causes the pin 56 to unseat from the locking recesses 66 in collar member 58. The auger member 20 is then twisted relative to drive shaft 30, which positions the pin 56 above the axially extending portion 63 of guide slot 60, whereupon the auger may be grasped and pulled in the feed direction to remove it from the flexible hopper 12. At this point, the entire hopper 12 may be grasped and pulled in the feeding direction which causes power unit 28 to slip out of the cylindrical space 18 as a unit without affecting the lip seal 50 in any way. A new or clean hopper 12 and auger member 20 may then be remounted to the power unit 28 by sliding the cylindrical portion 16 over the rigid tubular member 42, and by axially engaging the guide slot 60 of collar member 58 with the pin 56 of the power unit 28, and by twisting.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A dry good material feeding apparatus having an improved drive seal arrangement, comprising:

a feed hopper having an outer wall defining a storage portion for holding dry material and an auger housing portion, said auger housing portion having a first cylindrical space defined therein on a first side, and a second cylindrical space defined therein on a second side, said first and second cylindrical spaces being substantially aligned and extending through said outer wall so as to communicate said storage portion with an exterior space;

an auger member having a shaft and at least one helical flight connected thereto, said auger member being positioned so as to extend into both of said first and second cylindrical spaces;

means positioned in said first cylindrical space for supplying mechanical energy to turn said auger member; and means for sealing said supplying means with respect to said feed hopper, said sealing means comprising a rigid tubular member having a spaced defined therein, an outer surface of said tubular member tightly engaging a surface of said housing portion which defines said first space, a seal member having a first section sealingly engaged with said supplying means and a second section sewingly engaged with an inner surface of said tubular member whereby dry material is prevented from escaping said hopper via said first cylindrical space and said sealing means can be relatively inserted or withdrawn from said feed hopper as a unit, said helical flight extending in said first cylindrical space to an area which is proximate said sealing means, whereby dry material is urged away from said sealing means during operation of the apparatus.

2. Apparatus of claim 1, wherein said feed hopper is formed of a flexible material.

3. Apparatus of claim 1, wherein said supplying means comprises a drive shaft; means for transmitting mechanical energy to said drive shaft; and means for releasably connecting said drive shaft to said shaft of said auger member, whereby said auger member can be readily disconnected from said supplying means.

4. Apparatus according to claim 3, wherein said releasable connecting means comprises a collar member which is connected to said auger, and a pin member which is mounted in said drive shaft, said collar member having a slot defined therein for receiving said pin member.

5. Apparatus according to claim 4, wherein said releasable connecting means further comprises a locking recess defined in said collar member, said locking recess communicating with said slot so as to be able to receive said pin member; and means for biasing said pin member into said locking slot.

6. Apparatus according to claim 1, wherein said auger member comprises a sealing lip positioned on an outer helical edge of said helical flight.

7. Apparatus according to claim 6, wherein said sealing lip is formed of a material which is more resilient than the material said helical flight is formed of.

8. Apparatus according to claim 1, further comprising auxiliary means for keeping material away from said sealing means.

9. Apparatus according to claim 8, wherein said auxiliary means comprises a helical brush member which is mounted for rotation with said auger member.

10. A good dry material feeding apparatus having an improved drive seal arrangement, comprising:

a feed hopper having an outer wall defining a storage portion for holding dry material and an auger housing portion, said auger housing portion having a first cylindrical space defined therein on a first side, and a second cylindrical space defined therein on a second side, said first and second cylindrical spaces being substantially aligned and extending through said outer wall so as to communicate said storage portion with an exterior space;

an auger member having a shaft and at least one helical flight connected thereto, said auger member being positioned so as to extend into both said first and second cylindrical spaces, said auger member including a flexible helical sealing lip which extends into said first cylindrical space, said sealing lip being more flexible than the material said helical flight is made from;

means positioned in said first cylindrical space for supplying mechanical energy to turn said auger member; and means for sealing said supplying means with respect to said feed hopper, whereby dry material is prevented from escaping said hopper via said first cylindrical space, said helical flight extending in said first cylindrical space to an area which is proximate said sealing means, whereby dry material is urged away from said sealing means during operation of the apparatus.

11. A dry good material feeding apparatus having an improved drive seal arrangement, comprising:

a feed hopper having an outer wall defining a storage portion for holding dry material and an auger housing portion, said auger housing portion having a first cylindrical space defined therein on a first side, and a second cylindrical space defined therein on a second side, said first and second cylindrical spaces being substantially aligned and extending through said outer wall so as to communicate said storage portion with an exterior space;

an auger member having a shaft and at least one helical flight connected thereto, said auger member being positioned so as to have portions of said helical flight which extend into said first and second cylindrical spaces, said portion of said flight which extends into said first cylindrical space comprising material more flexible than the material from which said other portion of said flight is made;

means positioned in said first cylindrical space for turning said auger member; and means for sealing said turning means with respect to said feed hopper, whereby dry material is prevented from escaping said hopper via said first cylindrical space, said helical flight extending in said first cylindrical space to an area which is proximate said sealing means, whereby dry material is urged away from said sealing means by said flexible portion of said flight during operation of the apparatus.

12. A dry good material feeding apparatus according to claim 11 wherein said flexible portion of said flight comprises a helical brush which fits tightly within said first cylindrical space.

13. A dry good material feeding apparatus according to claim 11 wherein said flexible portion of said flight comprises a sealing lip on said flight which seals against an inner surface of said first cylindrical space.

14. A dry good material feeding apparatus according to claim 11 wherein said flexible portion of said flight is preferably made of a softer, more resilient material than said other portion of said flight.

15. A dry good material feeding apparatus according to claim 14 wherein said softer, more resilient material is a suitable polymer material.

16. A dry good material feeding apparatus having an improved drive seal arrangement, comprising:
- a feed hopper having an outer wall defining a storage portion for holding dry material and an auger housing portion, said auger housing portion having a first cylindrical space defined therein on a first side, and a second cylindrical space defined therein on a second side, said first and second cylindrical spaces being substantially aligned and extending through said outer wall so as to communicate said storage portion with an exterior space;
- an auger member having a shaft and at least one helical flight connected thereto, said auger member being positioned so as to have portions of said helical flight which extend into said first and second cylindrical spaces, said portion of said flight which extends into said first cylindrical space comprising more closely spaced flight members than said other portion of said flight;
- means positioned in said first cylindrical space for turning said auger member; and
- means for sealing said turning means with respect to said feed hopper, whereby dry material is prevented from escaping said hopper via said first cylindrical space, said helical flight extending in said first cylindrical space to an area which is proximate said sealing means, whereby dry material is urged away from said sealing means by said portion of said flight with more closely spaced flight members during operation of the apparatus.

* * * * *

UNITED STATES PATENT AND TRADEMARK OFFICE
CERTIFICATE OF CORRECTION

PATENT NO.  :    5,110,015
DATED       :    May 5, 1992
INVENTOR(S) :    Harold J. Kilts It is certified that error appears in the above-identified patent and that said Letters Patent is hereby corrected as shown below:

Column 5, line 61, claim 10; "A good dry" should read --A dry good--.

Column 5, line 19, claim 19; "sewingly" should read --sealingly--.

Signed and Sealed this

Seventeenth Day of August, 1993

Attest:

BRUCE LEHMAN

Attesting Officer

Commissioner of Patents and Trademarks